United States Patent
De Haan

(10) Patent No.: US 8,594,204 B2
(45) Date of Patent: Nov. 26, 2013

(54) METHOD AND DEVICE FOR BASIC AND OVERLAY VIDEO INFORMATION TRANSMISSION

(75) Inventor: Wiebe De Haan, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 2985 days.

(21) Appl. No.: 10/309,588

(22) Filed: Dec. 4, 2002

(65) Prior Publication Data

US 2003/0117529 A1 Jun. 26, 2003

Related U.S. Application Data

(62) Division of application No. 08/516,836, filed on Aug. 18, 1995, now abandoned.

(30) Foreign Application Priority Data

Jul. 21, 1995 (EP) .................................... 95202012

(51) Int. Cl.
   *H04N 7/12* (2006.01)
(52) U.S. Cl.
   USPC ..................................... 375/240.26; 386/244
(58) Field of Classification Search
   USPC ........ 375/240.01, 240.26; 348/467, 589, 600,
                                    348/468; 386/95, 96, 106
   IPC ....................................................... H04N 7/12
   See application file for complete search history.

(56) References Cited

U.S. PATENT DOCUMENTS

| | | | |
|---|---|---|---|
| 4,821,102 A | 4/1989 | Ichikawa et al. | |
| 4,953,153 A | 8/1990 | Suzuki | |
| 4,992,886 A | 2/1991 | Klappert | |
| 5,097,349 A | 3/1992 | Nomura et al. | |
| 5,151,793 A | 9/1992 | Ito et al. | |
| 5,185,665 A | 2/1993 | Okura et al. | |
| 5,206,929 A | 4/1993 | Langford et al. | |
| 5,245,600 A | 9/1993 | Yamauchi et al. | |
| 5,280,572 A | 1/1994 | Case et al. | |
| 5,301,028 A | 4/1994 | Banker et al. | |
| 5,424,785 A | 6/1995 | Orphan | |
| 5,497,241 A | 3/1996 | Ostrover et al. | |
| 5,519,443 A | 5/1996 | Salomon et al. | |
| 5,521,712 A * | 5/1996 | Oguro ........................... | 348/468 |
| 5,541,662 A | 7/1996 | Adams et al. | |

(Continued)

FOREIGN PATENT DOCUMENTS

| | | |
|---|---|---|
| CN | 1048279 A | 1/1991 |
| EP | 0056207 | 7/1982 |

(Continued)

*Primary Examiner* — Young Lee

(57) ABSTRACT

A method and transmitting system for transmitting an information signal, a receiving system for receiving the transmitted information signal, and an information carrier on which the information signal is recorded. The information signal is transmitted from the transmitting system to the receiving system. The information signal includes basic information and overlay information. The basic information includes video content that is adapted to be displayed on a display device. The overlay information includes overlay content and time information. The overlay content is adapted to be overlayed on a portion of the displayed video content for a period of time during the displaying of the video content. The overlay content, and not the portion of the displayed video content, appears visible during the period of time. The time information is indicative of the period of time.

62 Claims, 3 Drawing Sheets

(56) References Cited

U.S. PATENT DOCUMENTS

2004/0075668 A1  4/2004  Van Der Meer et al.

FOREIGN PATENT DOCUMENTS

| | | | |
|---|---|---|---|
| EP | 0332776 | A2 | 9/1989 |
| EP | 040251 | A1 | 12/1990 |
| EP | 0651391 | A2 | 10/1994 |
| EP | 0686973 | A1 | 12/1995 |
| JP | 022598 | A | 1/1990 |
| JP | 2-170687 | | 7/1990 |
| JP | 7-177459 | | 7/1995 |
| WO | 9200647 | | 1/1992 |
| WO | 9516990 | A1 | 6/1995 |
| WO | 9619077 | A1 | 6/1996 |

* cited by examiner

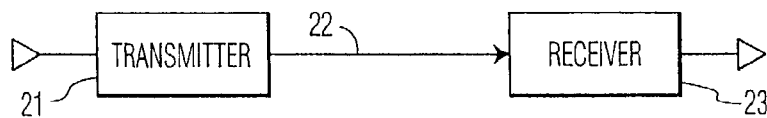
FIG. 2
| SYNTAX | NO. OF BITS |
|---|---|
| page | |
|   page_start_code | 16 |
|   page_data_length | 16 |
|   ... | .. |
|   duration | 32 |
|   ... | .. |
FIG. 3
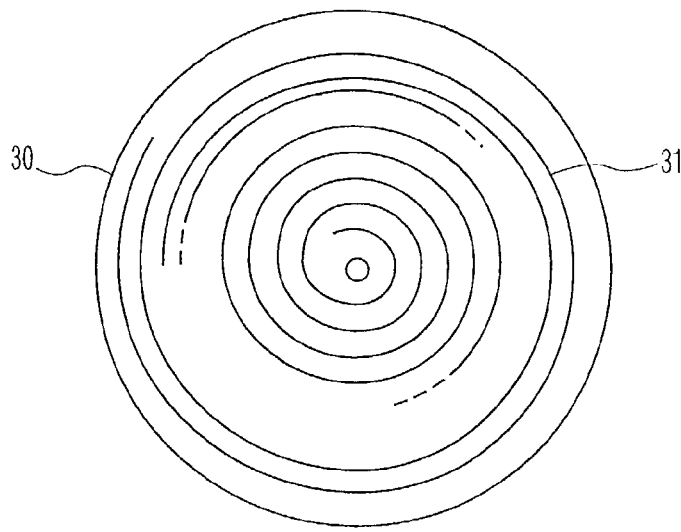
FIG. 4
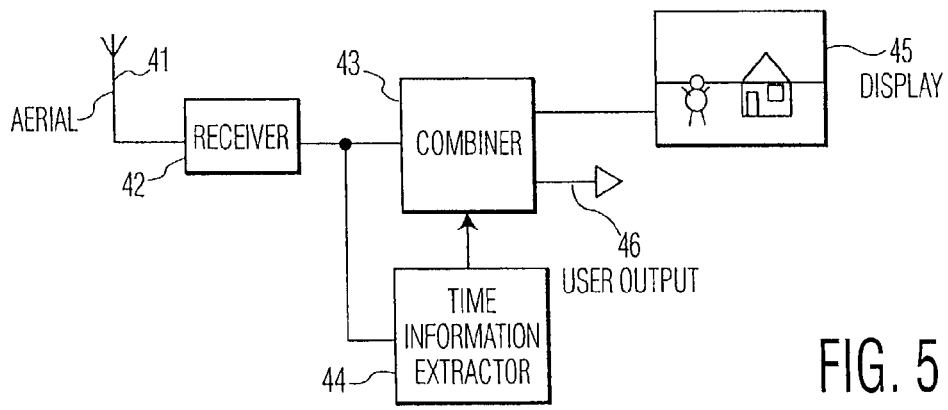
FIG. 5

METHOD AND DEVICE FOR BASIC AND OVERLAY VIDEO INFORMATION TRANSMISSION

This application is a divisional of Ser. No. 08/516,836, filed on Aug. 18, 1995.

FIELD OF THE INVENTION

The invention relates to a method of transmitting video information intended to be reproduced on a display via an information signal that represents the video information, the video information comprising basic information and overlay information related to the basic information.

The invention further relates to an information carrier on which an information signal is recorded, which signal represents video information intended to be reproduced on a display, which video information comprises basic information and overlay information related to the basic information.

The invention further relates to a device for receiving and a device for transmitting information to be used in the method.

BACKGROUND OF THE INVENTION

Such a method, information carrier and device are known from WO 92/00647. A video signal for which the basic information is analog video information, is transferred via a laser disc. Digitally encoded subtitle information is then recorded on the laser disc as overlay information separated from the video information in the sub-code of the digital audio signal. When this sub-code information is generated, the subtitle information is read from a file in which also the instant at which the text is to be shown is indicated. The subtitles are then recorded in the audio signal sub-code that corresponds to this instant. On reproduction, the subtitles are displayed once they have been recovered from the sub-code.

SUMMARY OF THE INVENTION

A problem in the known method is that a subtitle displayed on a television screen stays there until a next subtitle is received, so that a subtitle may remain too long on the screen in the case of, for example, a change of scenes. This may particularly occur if the next subtitle is not received, for example, when trick modes of the laser disc, such as Fast Forward or Backward, are used.

It is an object of the invention to provide means for transmitting video information for which the reproduction of overlay information is independent of information to be transmitted at a later stage.

According to a first aspect of the invention, a method of the type defined in the opening paragraph is thereto characterized in that the overlay information comprises time information which is indicative of a period of time during which the overlay information is to be displayed. The method according to the invention is advantageous, for example, in that the overlay information may be shown on a television screen for any desired period of time. This provides that displaying the overlay information may be linked more with the basic information.

An embodiment for the method according to the invention is characterized in that the time information comprises a duration indicative of the duration reckoned from an instant at which the overlay information may appear on the display. This embodiment is advantageous in that the given duration can be simply counted during display. A further advantage is achieved in the Fast Forward or Fast Backward mode in which the overlay information can still be displayed for the original duration.

A further embodiment for the method according to the invention is characterized in that the basic information includes time codes indicative of a relative time of the basic information, and in that the time information includes a time of removal indicative of a relative instant after which the particular overlay information is to be removed from the display. This embodiment is advantageous in that during reproduction the duration may be simply determined by comparing the time of removal with the running relative time. The moment a more advanced relative time is found, the overlay information is removed from the display.

A further embodiment for the method according to the invention is characterized in that the basic information comprises video information and the overlay information comprises graphics information. This embodiment is advantageous in that the basic information is a moving image and the overlay information is a graphics picture optionally to be overlaid.

A further embodiment for the method according to the invention is characterized in that the overlay information comprises subtitle texts. This embodiment is advantageous in that the subtitle texts can be optionally overlaid on the basic information.

A further embodiment for the method according to the invention is characterized in that the basic information comprises digital, compressed video information. This embodiment is advantageous in that both the basic information and the overlay information may be transmitted in like manner, represented by digital symbols.

According to a second aspect of the invention, an information carrier of a type defined in the opening paragraph is thereto characterized in that the overlay information comprises time information which is indicative of a period of time during which the overlay information is to be displayed. The information carrier according to the invention is advantageous, for example, in that the overlay information may be displayed on a television screen for the desired duration, irrespective of other information to be read subsequent to that particular overlay information. For the provider of the video information it is advantageous that the duration may be determined irrespective of the playing device.

According to a third aspect of the invention, a device comprising means for receiving an information signal of a type defined in the opening paragraph and combining means for generating a video signal representative of the basic information in combination with the overlay information, is thereto characterized in that the device comprises means for recovering the time information from the information signal and in that the combining means are arranged for displaying the overlay information as a function of the time information. The device according to the invention is advantageous, for example, in that for the desired duration the overlay information can be combined with the basic information for displaying information on a television screen which information is irrespective of other information to be received subsequent to that particular overlay information.

According to a fourth aspect of the invention, a device comprising generator means for generating an information signal of a type defined in the opening paragraph and means for transmitting the information signal is characterized in that the device comprises means for generating the time information and the generator means are arranged for adding the time information to the overlay information. The device according to the invention is advantageous, for example, in that during the transmission there may be determined how long the overlay information is to be displayed together with the basic information without the necessity of including information in the information signal at a later instant.

BRIEF DESCRIPTION OF THE DRAWINGS

These and other aspects of the invention will be apparent from and elucidated with reference to the embodiments described hereinafter.

In the drawings:

FIG. 2 shows a system for transmitting video information,

FIG. 3 shows a Table of duration-information,

FIG. 4 shows an information carrier,

FIG. 5 shows a device for receiving video information,

Elements corresponding to elements described in previous Figures carry like reference characters.

DETAILED DESCRIPTION OF THE INVENTION

Figure 1A:
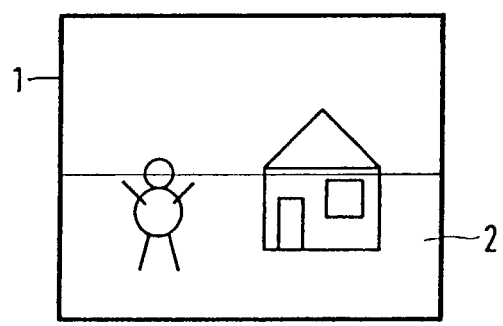
FIG. 1 shows a television screen displaying video information.
Figure 1B:
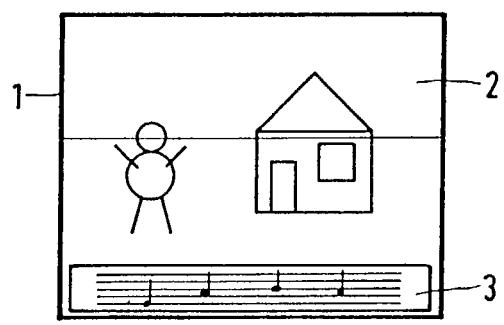
Figure 1C:
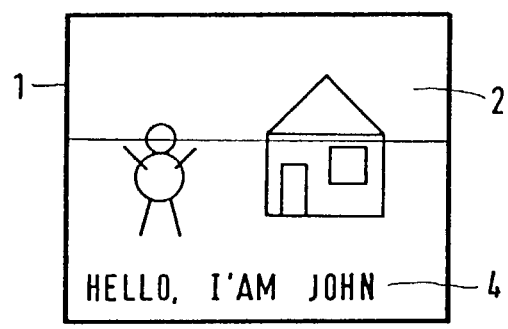

FIG. 1 shows a television screen 1 on which video information is displayed. This video information comprises basic information 2 displayed over the entire surface of the television screen as shown in FIG. 1a. The basic information 2 may be formed by moving images, such as film images or a television program. The basic information may also comprise animations or still, photographic images. FIG. 1b shows the same basic information 2 on which graphics information 3 is displayed as overlay information. For example, the basic information 2 may remain the same in the background, whereas repeatedly new musical notes may be displayed as overlay information. FIG. 1c shows a subtitle text 4 as overlay information such as can be used for films. In a television system the overlay information is combined with the basic information prior to transmission and this overlay information is transmitted along in each image of the basic information. By transmitting the overlay information in a separate manner as is done, for example, in said WO 92/00647, more than one piece of overlay information can be transmitted along. The user may then choose, for example, from several languages, or omit the subtitles 4 entirely.

FIG. 2 shows a system for video information transmission. The video information is transmitted via an information signal such as, for example, a television signal, a digitally modulated signal via a network, or a recorded signal on a magnetic tape, such as VCR (Video Cassette Recorder) or on an optical disc such as a laser disc or digital video disc. The device 21 for transmitting the information signal will transmit the video information signal to the receiving device 23 by the transmission channel 22. The receiving device 23 reproduces the video signal for the user. The information signal comprises at least a representation of the basic information such as, for example, an analog PAL or NTSC video signal or an MPEG-1 or MPEG-2 digitally encoded and compressed video signal. In addition, the information signal comprises a representation of the overlay information encoded by information symbols which symbols may be separately recovered from the basic information. A page of overlay information will be replaced if after a while a next page of overlay information is received. Another option is transmitting the overlay information along with every new image. However, this is at the cost of much transmission capacity, especially if, for example, subtitles for a plurality of languages are to be transmitted. In a video signal the symbols may be transmitted along in the form of digital signals during the horizontal or vertical blanking. In fully digitized information streams a separate user data stream may be transmitted by multiplexing, for example, by subdividing the digital data stream into packets and providing them with headers which denote the type of information. In the case of MPEG-2, the video information is encoded as described in ITU/ISO 13818-2 international standard. In ITU/ISO 13818-1 is described how elementary streams of encoded video data are multiplexed together with other encoded data representative of, for example, audio and subtitles into an MPEG-2 program stream. Information of a type not specified by MPEG can be included in 'private packets' in a format to be chosen at will. MPEG-2 then distinguishes packets carrying an additional header of a prescribed format as "private stream 1", and without a prescribed format as "private stream 2". The subtitles may be included, for example, in private stream 1 packets; these packets may comprise an optional presentation time stamp which denotes the initial presentation time on the television screen. A subtitle will not be replaced until the presentation time of a next subtitle has come.

In the information signal according to the invention, the overlay information comprises time information indicating a duration for which the overlay information is to be displayed on the television screen. Symbols described above intended for the overlay information are included in the information signal, for example, in private packets in a MPEG-2 stream. These packets now contain a time code. FIG. 3 shows in a Table an example of an information signal with a time code according to the invention which can be added to the overlay information to control the display of an overlay page. The available number of bits is given per parameter. A page_start_code denotes the beginning of the page, a page_data_length denotes the amount of information of the page and there is room for other control information, for example, the duration 25. The time code may denote, for example, the duration in seconds (or parts thereof). A different suitable time unit such as the number of frames or the number of units of an available system clock, for example, 90 kHz in MPEG, may also be selected. This duration starts when the overlay information is displayed on the television screen, for example, after the presentation time stamp in MPEG-2.

In the case of a basic information signal which comprises time codes indicative of a relative time of the basic information, there is a time indication available in a relation to the displayed basic image. In this case the time information may be indicated by a time of removal, which is indicative of the (relative) instant from which the particular overlay information is no longer to be displayed on the television screen. The time information for MPEG-2 may be included, for example, in the extension of the packet header or in the user data.

FIG. 4 shows a disc-shaped optically readable information carrier 30 such as a CD or laser disc. In a helical or concentric track 31 is recorded the information signal which represents video information to be displayed on a television screen. A description of the reading of a CD can be found in the title "Principles of optical disc systems" by Brouwhuis et al., ISBN 0-85274-785-3. The video information and the information signal are described with reference to FIGS. 1 and 2. The overlay information then comprises in a manner described with reference to FIG. 3 time information which is indicative of a duration for which the overlay information is to be displayed on the television screen.

FIG. 5 shows a device for receiving video information, such as a satellite receiver or a television signal decoder also referenced set-top-box. The transmitted signal arrives at the receiving means 42 via an aerial 41 (no part of the device) or via a cable connector. In the receiving means 42 the information signal is recovered and fed to combining means 43 in which a video signal is generated from the basic information combined with the overlay information. The information signal is also fed to means 44 for recovering the time information, while these means 44 at the appropriate instants give a command to the combining means 43 to remove the overlay information from the television screen in dependence on the time information. The video signal may be supplied to the user through output 46. In another embodiment the device also comprises a display 45 on which the image can be reproduced direct.

Figure 6:
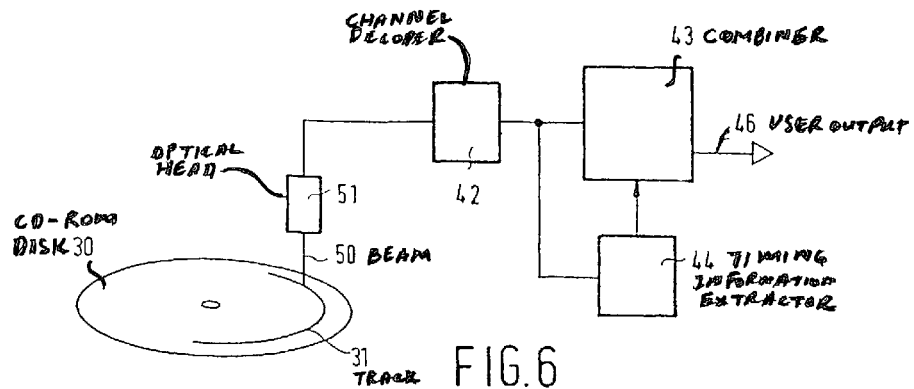
FIG. 6 shows a device for reading an information carrier.

FIG. 6 shows a device for reading an information carrier 30, such as, for example, a CD. The device comprises scanning means 51 for scanning the track 31 via an optical beam 50. The device further corresponds to the device of FIG. 5. The received signal goes to the receiving means 42 and, subsequent thereto, to the combining means 43 and the means 44 for recovering the time codes. The information signal processing has been described with reference to FIG. 5.

Figure 7:
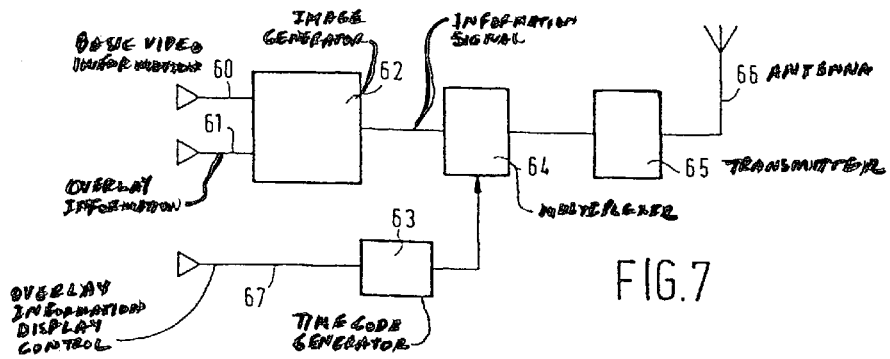
FIG. 7 shows a device for transmitting video information.

FIG. 7 shows a device for transmitting video information such as, for example, a television transmitter. The video information is fed to image generator means 62; the basic information is fed through an input 60 and the overlay information through a separate input 61. The image generator means 62 encode the video information and generate the information signal. Information about the display of overlay information is fed through input 67 to the time code generator means 63 which generates time codes for the duration of the display. The duration may, for example, be predefined and stored in a computer file, but the duration may also be automatically derived from the length of a subtitle or manually by an operator. In a multiplexer 64 the generated time codes are added to the overlay information, after which the complete information signal is amplified in the transmitting means 65 to be transmitted via antenna 66. If subtitle texts for a film are available in two languages, the time code generator means 63 will generate separate time codes for the two languages. In the receiver there may then be selected between no subtitling or subtitling in either language.

Figure 8:
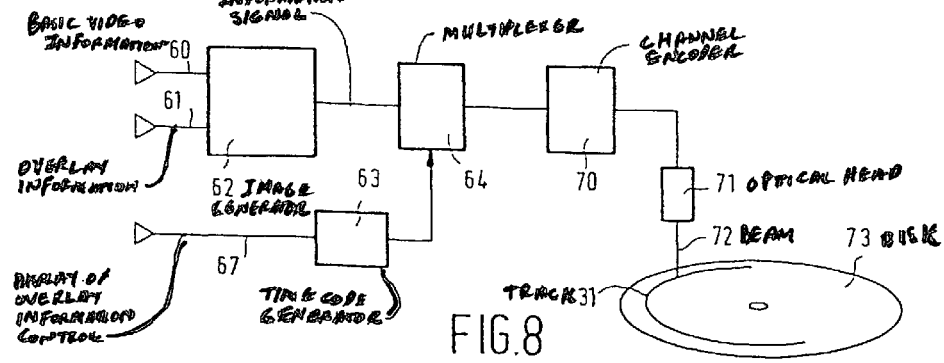
FIG. 8 shows a device for transmitting video information via information carriers.

FIG. 8 shows a device for transmitting video information via information carriers, such as, for example, for CD-ROMs. First a master information carrier is made by the device shown. From this master information carrier are then produced a multiplicity of information carriers with a customary process with moulds and presses (not shown). The complete information signal is generated by generator means (62, 63, 64) as described with reference to FIG. 7. The channel encoding unit 70 encodes the information signal in a manner customary to the disc-shaped carrier and passes this information on to the radiation unit 71. Radiation unit 71, by means of radiation beam 72, for example, a high-intensity laser beam, introduces effects on the master information carrier 73. A system controller of a customary type (not shown) provides the control of the speed of rotation of the disc and the positioning of the radiation unit 71 over the track 31. For a further description of the CD system reference be made to the title stated with reference to FIG. 4. In another embodiment a similar device is suitable for recording the information signal on a record carrier which is directly recordable, such as a CD recordable, a VCR tape or an optical tape.

The embodiments for devices are not restricted to the examples of FIGS. 5, 6, 7 and 8 and comprise any device for receiving and/or transmitting video information while overlay information comprises time information indicating the duration of display.

The invention claimed is:

1. A method of transmitting an information signal from a transmitting system to a receiving system, said method comprising the steps of:
    acquiring basic information including video content capable of being displayed on a display device;
    acquiring overlay information including overlay content capable of being displayed on a display device, and time information;
    combining said basic information, said overlay content and said time information to form an information signal; and
    transmitting said information signal from a transmitting system to a receiving system,
    wherein, in said receiving system, the overlay content in the information signal is overlaid on a portion of the displayed video content for a period of time during the displaying of the video content,
    wherein the overlay content, and not the portion of the displayed video content, appears visible during the period of time, and
    wherein the time information is indicative of the period of time.

2. The method as claimed in claim 1, wherein the period of time is independent of a rate at which the basic information is displayed.

3. The method as claimed in claim 2, wherein the rate is the rate at which the basic information is displayed in a trick mode.

4. The method as claimed in claim 1, wherein the time information includes the period of time, and wherein the period of time is a duration reckoned from an instant of time at which the overlay content first appears as overlaid on the portion of the displayed video content.

5. The method as claimed in claim 4, wherein the duration is independent of a rate at which the basic information is displayed.

6. The method as claimed in claim 5, wherein the rate is the rate at which the basic information is displayed in a trick mode.

7. The method as claimed in claim 1, wherein the period of time is independent of additional information transmitted by the transmitting system to the receiving system after said transmitting of the information signal.

8. The method as claimed in claim 1, wherein the basic information includes time codes indicative of a relative running time of the basic information, wherein the time information includes a time of removal after which the overlay content is to discontinue being overlaid on the portion of the displayed video content, and wherein the period of time is a function of the time of removal.

9. The method as claimed in claim 8, wherein the period of time is adapted to be determined by comparing the time of removal with the relative running time while the overlay content is being overlaid on the portion of the displayed video content.

10. The method as claimed in claim 1, wherein the overlay content relates to a subject matter of the video content.

11. The method as claimed in claim 1, wherein the portion of the displayed video content is less than the displayed video content in its entirety.

12. The method as claimed in claim 1, wherein the overlay content comprises graphics information.

13. The method as claimed in claim 1, wherein the overlay content comprises subtitle texts.

14. The method as claimed in claim 1, wherein both the basic information and the overlay information are represented by digital symbols.

15. The method as claimed in claim 1, wherein the video content during said transmitting is in a digital, compressed video format.

16. The method as claimed in claim 1, wherein the video content during said transmitting is in an analog format.

17. The method as claimed in claim 1, wherein the video content comprises animated video content.

18. The method as claimed in claim 1, wherein the video content comprises still, photographic images.

19. The method as claimed in claim 1, wherein the information signal is a television signal.

20. The method as claimed in claim 1, wherein the information signal is a digitally modulated signal via a network.

21. The method as claimed in claim 1, wherein the video content during said transmitting is in a digital, compressed video format, wherein transmitting the information signal comprises transmitting a digital data stream that includes the information signal, wherein the method further comprises dividing the digital data stream into packets that comprise the basic information and the overlay information such that each packet has a packet header, and wherein the packet header includes an indication of the type of information contained within the packet that comprises the packet header.

22. The method as claimed in claim 21, wherein the packet header comprise the time information.

23. The method as claimed in claim 1, further comprising prior to said transmitting:
  generating a preliminary information signal from the basic information and the overlay content as received from a source;
  generating the time information; and
  adding the generated time information to the overlay content in the preliminary information signal, to form the information signal to be transmitted in accordance with said transmitting.

24. The method as claimed in claim 1, wherein the source comprises a magnetic tape.

25. The method as claimed in claim 1, wherein the source comprises an optical disc.

26. The method as claimed in claim 1, wherein the receiving system comprises a satellite receiver.

27. The method as claimed in claim 1, wherein the information signal is a television signal, and wherein the receiving system comprises a television signal decoder.

28. A transmitting system comprising:
  means for acquiring basic information including video content capable of being displayed on a display device;
  means for acquiring overlay information includes overlay content capable of being displayed on a display device and time information;
  combining means for combining said basic information and said overlay information to form an information signal; and
  transmitting means for transmitting said information signal to a receiving system,
  wherein, in the receiving system, the overlay content is overlaid on a portion of the displayed video content for a period of time during the displaying of the video content,
  wherein the overlay content, and not the portion of the displayed video content, appears visible during the period of time, and
  wherein the time information is indicative of the period of time.

29. The transmitting system as claimed in claim 28, wherein the period of time is independent of a rate at which the basic information is displayed.

30. The transmitting system as claimed in claim 28, wherein the period of time is independent of additional information transmitted by the transmitting means to the receiving system after said transmitting of the information signal.

31. The transmitting system as claimed in claim 28, further comprising:
  image generator means for generating the information signal from the basic information and the overlay content as received from a source;
  time code generating means for generating the time information; and
  multiplexer means for adding the time information generated by the time code generating means to the overlay content in the information signal generated by the image generator means, to form the overlay information within the information signal, said information signal so formed to be transmitted by the transmitting means.

32. A receiving system, comprising receiving means for receiving an information signal transmitted from a transmitting system,
  wherein the information signal comprises basic information and overlay information,
  wherein the basic information includes video content capable of being displayed on a display device,
  wherein the overlay information includes overlay content and time information,
  wherein the overlay content in the information signal is capable of being displayed on a display device, said overlay content being overlaid on a portion of the displayed video content for a period of time during the displaying of the video content,
  wherein the overlay content, and not the portion of the displayed video content, appears visible during the period of time, and
  wherein the time information is indicative of the period of time.

33. The receiving system as claimed in claim 32, wherein the period of time is independent of a rate at which the basic information is displayed.

34. The receiving system as claimed in claim 32, wherein the period of time is independent of additional information transmitted by the transmitting system to the receiving means after said transmitting of the information signal.

35. The receiving system as claimed in claim 32, wherein the receiving system further comprises:
  generating means for generating a video signal from the basic information and the overlay content in the information signal received by the receiving means and for transmitting the video signal to a display device; and
  time extracting means for extracting the time information from the information signal received by the receiving means and for commanding the generating means to remove the overlay content from the display device in dependence on the time information.

36. A receiving system according to claim 32, wherein the basic information is a digital compressed video stream.

37. A receiving system according to claim 36, wherein the time information includes a time at which the overlay content first appears as overlaid on the portion of the displayed video content and a time of removal after which the overlay content is no longer overlaid on the portion of the displayed video content.

38. A receiving system according to claim 36, wherein the overlay content comprises subtitle text.

39. A receiving system according to claim 36, wherein the information signal is a digitally modulated signal via a network.

40. A receiving system according to claim 36, wherein overlaying the overlay information can be disabled by a user.

41. A receiving system according to claim 36, wherein the overlay information comprises more than one piece of overlay information and the user may choose which piece of display information is being displayed.

42. A receiving system according to claim 36, wherein the digital compressed video stream and the overlay information are multiplexed.

43. A receiving system according to claim 36, wherein the overlay information is in the form of a private MPEG stream.

44. A receiving system according to claim 36, wherein the time information includes time codes expressed in parts of a second.

45. A receiving system according to claim 36, wherein the time information includes time codes expressed in units of an available clock at a receiver, such as an MPEG clock.

46. A receiving system according to claim 36, wherein the overlay information includes graphical information.

47. A receiving system according to claim 36, wherein the time information includes a period of time, and wherein the period of time is a duration reckoned from an instant of time at which the overlay content first appears as overlaid on the portion of the displayed video content.

48. An information carrier, comprising a substrate and an information signal recorded on the substrate,
    wherein the information signal comprises basic information and overlay information,
    wherein the basic information includes video content capable of being displayed on a display device,
    wherein the overlay information includes overlay content and time information,
    wherein the overlay content in the information signal is capable of being displayed on a display device, said overlay content being overlaid on a portion of the displayed video content for a period of time during the displaying of the video content,
    wherein the overlay content, and not the portion of the displayed video content, appears visible during the period of time, and
    wherein the time information is indicative of the period of time.

49. The information carrier as claimed in claim 48, wherein the period of time is independent of a rate at which the basic information is displayed.

50. A method of receiving an information signal transmitted from a transmitting system, the method comprising,
    receiving an information signal transmitted from a transmitting system,
    wherein the information signal comprises basic information and overlay information,
    wherein the basic information includes video content capable of being displayed on a display device,
    wherein the overlay information includes overlay content and time information,
    wherein the overlay content in the information signal is capable of being displayed on a display device, said overlay content being overlaid on a portion of the displayed video content for a period of time during the displaying of the video content,
    wherein the overlay content, and not the portion of the displayed video content, appears visible during the period of time, and
    wherein the time information is indicative of the period of time.

51. A method according to claim 50, wherein the basic information is a digital compressed video stream.

52. A method according to claim 51, wherein the time information includes a time at which the overlay content first appears as overlaid on the portion of the displayed video content and a time of removal after which the overlay content is no longer overlaid on the portion of the displayed video content.

53. A method according to claim 51, wherein the overlay content comprises subtitle text.

54. A method according to claim 51, wherein the information signal is a digitally modulated signal via a network.

55. A method according to claim 51, wherein overlaying the overlay information can be disabled by a user.

56. A method according to claim 51, wherein the overlay information comprises more than one piece of overlay information and the user may choose which piece of display information is being displayed.

57. A method according to claim 51, wherein the digital compressed video stream and the overlay information are multiplexed.

58. A method according to claim 51, wherein the overlay information is in the form of a private MPEG stream.

59. A method according to claim 51, wherein the time information includes time codes expressed in parts of a second.

60. A method according to claim 51, wherein the time information includes time codes expressed in units of an available clock at a receiver, such as an MPEG clock.

61. A method according to claim 51, wherein the overlay information includes graphical information.

62. A method according to claim 51, wherein the time information includes a period of time, and wherein the period of time is a duration reckoned from an instant of time at which the overlay content first appears as overlaid on the portion of the displayed video content.

\* \* \* \* \*